UNITED STATES PATENT OFFICE.

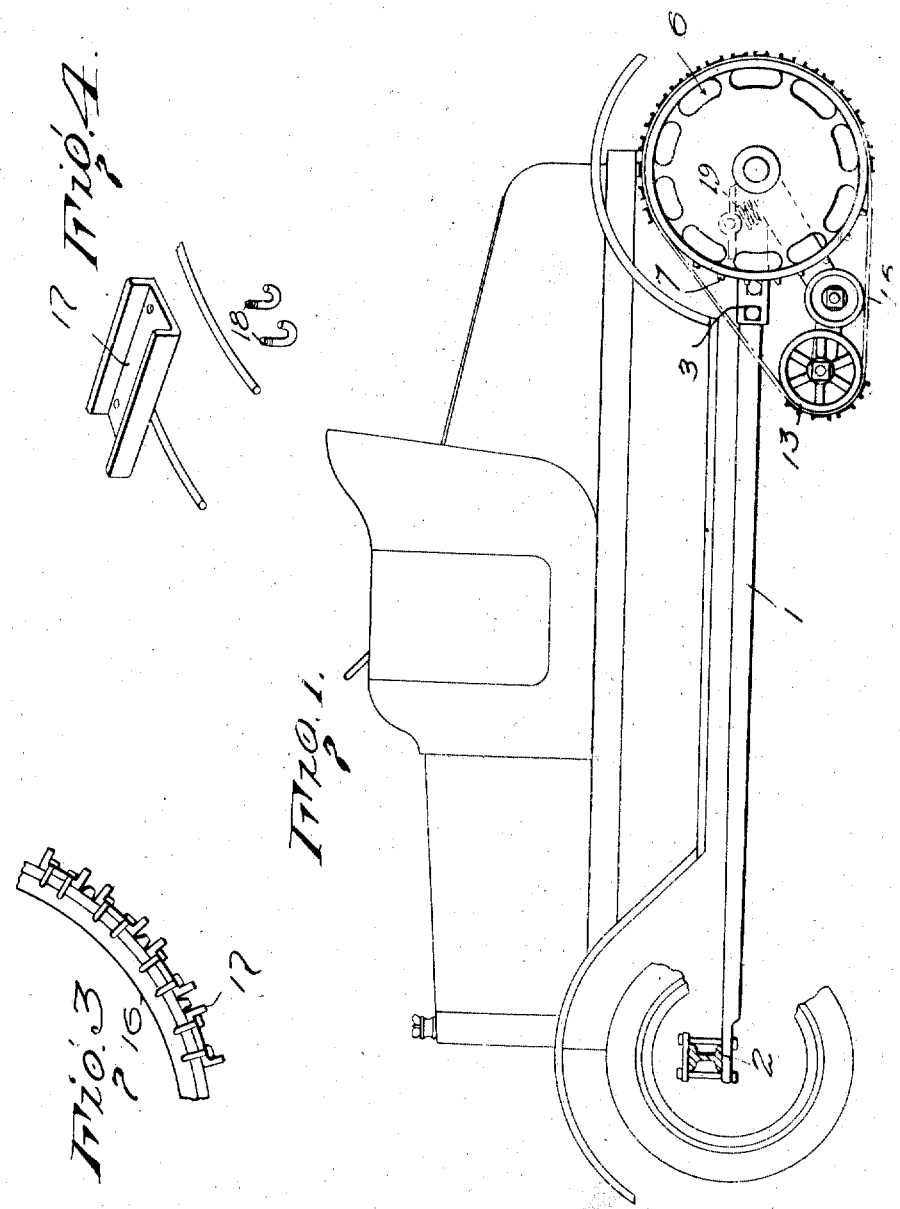

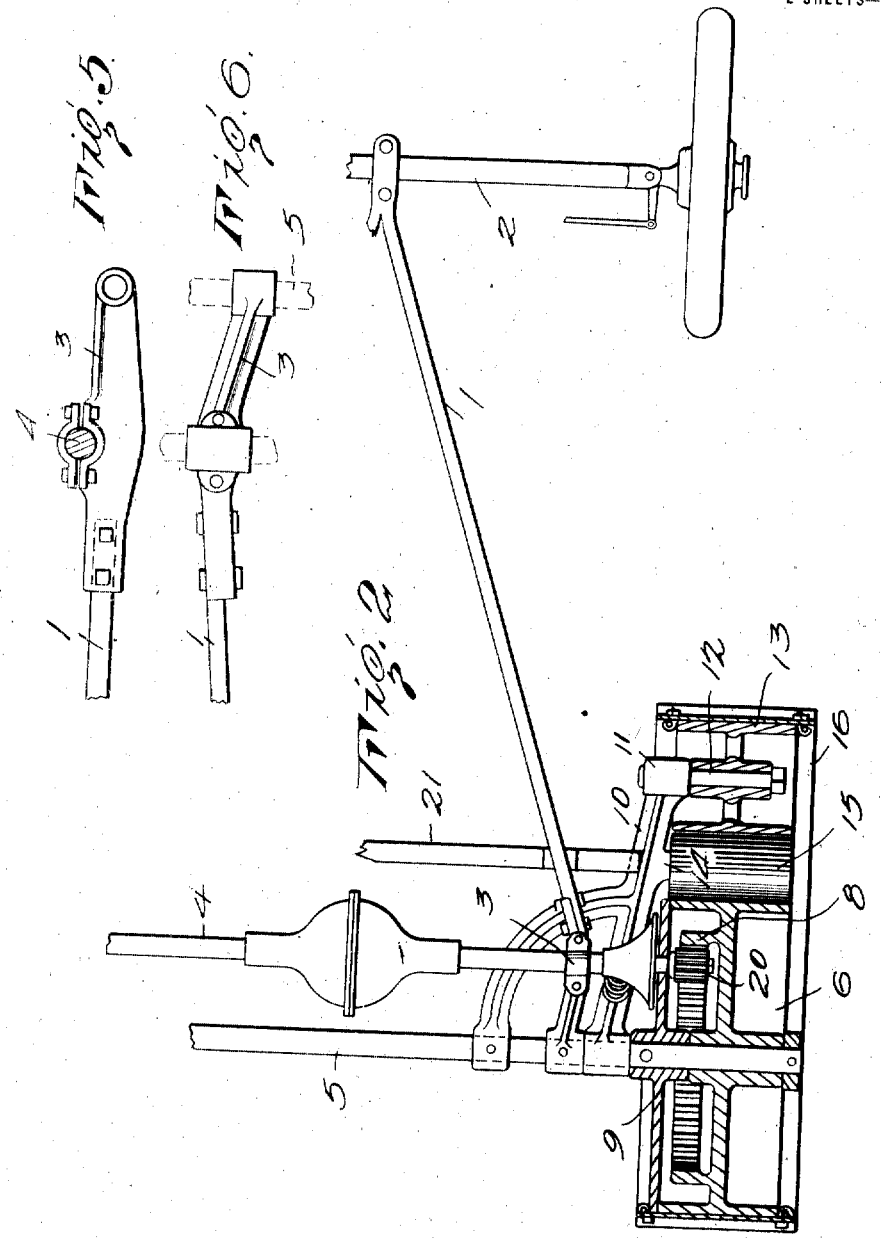

PRIMM R. HAWTHORNE, OF SPOKANE, WASHINGTON, ASSIGNOR TO ROSS E. GALLAGHER, OF SPOKANE, WASHINGTON.

TRACTOR-DRIVE ATTACHMENT.

1,245,337.  Specification of Letters Patent.  Patented Nov. 6, 1917.

Application filed March 28, 1917. Serial No. 157,964.

*To all whom it may concern:*

Be it known that I, PRIMM R. HAWTHORNE, a citizen of the United States, and resident of Spokane, in the county of Spokane and State of Washington, have invented certain new and useful Improvements in Tractor-Drive Attachments, of which the following is a specification.

The present invention has reference to motor vehicles and relates more particularly to an improved tractor drive attachment therefor.

The dominant object of the invention is to provide a tractor drive for automobiles, whereby, the same can be readily converted into a tractor for heavy duty purposes with but slight alteration to the running gear of the automobile.

It is a more specific object of the invention to provide a novel mode of attachment for the tractor drive, the same including a multiple point connection, certain of which occur at the opposite ends of the automobile rear axle and another, in proximity of the center of the front axle thereof.

Another and equally important object of the invention is to attach to an automobile drive or rear axle, a drive wheel of the caterpillar type.

In furtherance of the above objects, it is also an aim of the invention to provide a variable driving medium for the attachment, that is, one which may be changed from one type of driving element to another.

Further, another important characteristic of the invention resides in the provision of means for yieldably maintaining the caterpillar tread or track in engagement with the ground or other surface over which the motor vehicle is to travel.

All of the foregoing together with additional advantageous details and arrangements of parts of the preferred embodiments of my invention will be clear from the specific description hereinafter contained, when read in connection with the accompanying drawings forming parts hereof, wherein said embodiments of the invention are illustrated for the purpose of facilitating a full understanding of the present improvements.

In the drawings:

Figure 1 is a side elevation of an automobile with my improved tractor drive attachment applied thereto, portions of the vehicle being broken away;

Fig. 2 is a fragmentary horizontal section through the running gear thereof;

Fig. 3 is a fragmentary detail in elevation of the tread of the caterpillar drive element;

Fig. 4 is a disassembled perspective of one of the tread or anti-skid elements;

Fig. 5 is a detail in side elevation of the drive attachment supporting means; and Fig. 6 is a top plan thereof.

Referring now more specifically to the drawings, and in connection with which like reference characters will refer to the same parts in the several views, I provide a plurality of divergent reach rods designated 1, the forward extremities of which are secured, preferably, centrally of the forward axle 2 of the automobile through the medium of a suitable bracket carried thereby; while the rear extremities are reduced and have secured thereto, by bolts, bearing arms 3, certain of the bearings being arranged about the rear or drive axle 4 of the vehicle while others thereof project laterally from the axle and serve as means for supporting the drive element axle, which will be subsequently described. It may be here noted, that a pair of drive elements are employed and that further, that the construction of each is identical as well as means for imparting driving motion thereto. Hence, in the description to follow, reference will be made to but one, it being understood that such reference will suffice for each construction.

A secondary axle 5 for supporting the tractor drive element is arranged within the laterally extending bearings formed in the arms 3 and has mounted upon its opposite extremities drive wheels one of which is shown and designated in its entirety by the numeral 6, the same having arranged about its peripheral surface a plurality of alined sprocket teeth 7. To the web portion of the wheel 6 there is formed an internal gear 8, which gear is adapted to be meshed with motion imparting means arranged upon the drive axle 4. A disk like shield 9 having a concentric opening is arranged upon the axle 5 adjacent the inner side of the wheel 6 and obviously serves as a guard for the internal gear 8 and the motion imparting means. To secure the disk 9 in position, a set screw or like fastening device may be and preferably is carried by the same and turned into engagement with an adjacent portion of the said axle 5.

To that portion of the axle 5 adjacent the wheel 6 there is arranged an angle bearing arm 10 having a bifurcated extremity provided with bearing collars receivable upon said axle. A bearing collar 11 is formed upon the forward extremity of the arm 10 and carries a pintle 12 therein upon which an idler 13 is mounted. A second pintle 14 is arranged upon the arm adjacent the point of bending and is provided with a second idler 15.

An endless tread 16 is arranged about the wheel 6 and the idlers 13 and 15, thus, constituting the ordinary caterpillar drive. The endless tread 16 comprises a plurality of spaced cables having transversely disposed channeled bars 17 secured thereto through the medium of bolts 18 having hooked extremities formed thereon, which hooked extremities receive the said cables therein. As shown in the Fig. 2, the arrangement of the hooked extremities of the bolts 18 is such as to afford an efficient guide or way in which the peripheral surfaces of the wheel 6 and the idlers 13 and 15 may travel, thus, preventing undue lateral displacement of the said tread. By the provision of the channeled bars 17 an efficient anti-skid means is provided whereby longitudinal slipping of the caterpillar during operation will be obviated. The relative spacing of the channeled bars 17 is such as to afford pockets for receiving the sprocket teeth 7 of the wheels therebetween.

An expansible coiled spring 19 is seated upon a portion of the angle arms 10 and has bearings upon the collar or bearing 3 arranged about the drive axle 4. Thus, a downward thrust is normally imparted to the angle arm and as a consequence, the idlers 13 and 15 are yieldably maintained in engagement with the ground or other surface over which the vehicle is to travel.

Spur pinions 20 are mounted upon the opposite extremities of the drive axle 4 and are in constant mesh with the internal gear 8 carried upon the drive wheel 6. Hence, upon rotation of the drive axle, rotary motion will be imparted by way of the said gear to the wheel and the vehicle, thus, propelled. In this connection, it is to be noted, that the gearing comprising the internal and spur gears may be eliminated and the usual sprocket and chain gearing substituted in lieu thereof, such as conditions or preference may dictate.

Further, I desire to have it understood that should it be desired, the caterpillar type of drive may be readily removed from the axle 5 and the conventional "bull" wheel type of drive employed. By this arrangement, the tractor may be successfully used in localities wherein the character of soil varies.

Instead of employing the coiled springs 19 as the means for yieldably maintaining the idlers 13 and 15 in engagement with the surface over which the vehicle is to travel, the usual design of leaf spring 21 may be employed, the same having its opposite extremities bearing upon portions of the angle bearing arms 10 and being secured intermediate its ends to the reach bars 1.

By the novel mounting of the secondary axle it will be noted that the transmission of strain or pull to the automobile drive axle will be prevented during the operation thereof. Hence, the body or running gear of the automobile will not be affected by the heavy duty to which it is adapted when being used with the tractor attachment.

Manifestly, the construction shown is capable of considerable modification and such modification as is within the scope of my claims, I consider within the spirit of my invention.

I claim:

1. In a tractor drive attachment, the combination with a drive axle of a motor vehicle, of a secondary axle, drive wheels mounted on the extremities of the secondary axles, pivotal arms arranged on the extremities of the said secondary axle and carrying idlers, an endless tread disposed about the wheels and idlers, resilient means engaged with the bearing arms for yieldably maintaining the idlers in engagement with a surface, and gearing connecting the drive axle and wheels.

2. In a tractor drive attachment, the combination with a motor driven vehicle and the forward and drive axles thereof, of reach bars engaged with said axles, bearing brackets carried upon certain of the extremities of said reach rods, a secondary axle mounted in said bearing brackets, drive elements on the opposite extremities of the secondary axle, angle bearing arms pivotally arranged adjacent the extremities of the secondary axle, idlers carried by the angle arms upon the extremities and near extremities thereof, an endless tread disposed about the driving elements and said idlers, and resilient means engaged with the angle arms for normally maintaining the idlers in yieldable contact with a surface.

3. In a tractor drive attachment, the combination with a motor vehicle and the forward and drive axles thereof, of divergent reach rods secured to said axles, bearing brackets carried upon certain of the extremities of the reach rods, a secondary axle mounted in said bearing bracket, driving elements on the extremities of the secondary axle, angle bearing arms pivotally arranged adjacent the extremities of said secondary axle, idlers arranged upon the free extremities of said angle arms, endless treads disposed about the drive elements and the idlers, spring means engaged with said angle arms for normally maintaining the idlers and tread in yieldable contact with a surface, and gearing connecting the drive axle and drive elements.

4. In a tractor drive attachment, the combination with a motor vehicle and the forward and drive axles thereof, of divergent reach rods secured to said axles, bearing brackets secured to certain of the extremities of the reach rods, a secondary axle mounted in the bearing brackets, driving elements on the extremities of said secondary axle, internal gears formed integral with said driving elements, pinions mounted upon the extremities of the drive axle and meshed with said internal gears, angle bearing arms pivotally mounted adjacent the extremities of said secondary axle, a plurality of idlers carried by the angle bearing arms, an endless tread disposed about the driving elements and the idlers, and spring means engaged with the angle bearing arms for maintaining the idlers and endless tread in yieldable contact with a surface.

In testimony whereof, I affix my signature hereto.

PRIMM R. HAWTHORNE.